Oct. 11, 1927.

M. S. LOWER 1,645,248

PROCESS OF MANUFACTURING FABRIC COVERED CUSHIONS

Filed April 7, 1927

INVENTOR.
MELVIN S. LOWER
BY Ely & Barrow
ATTORNEYS

Patented Oct. 11, 1927.

1,645,248

UNITED STATES PATENT OFFICE.

MELVIN S. LOWER, OF BARBERTON, OHIO, ASSIGNOR TO THE SUN RUBBER COMPANY, OF BARBERTON, OHIO, A CORPORATION OF OHIO.

PROCESS OF MANUFACTURING FABRIC-COVERED CUSHIONS.

Application filed April 7, 1927. Serial No. 181,815.

This invention relates to the manufacture of elastic or yielding rubber cushions which are covered with fabric, and particularly to the manufacture of cushions of sponge rubber covered with felt. The invention is illustrated as applied to the manufacture of rolled edge cushions such as may be used for the covering of stools, the cushions being provided with a flange which passes around and grips the side of the stool.

The object of the invention is to provide a process for vulcanizing and covering cushions of this type with a layer of felt, the cover being smoothly and evenly applied to the cushion without skilled labor and with perfect results.

While the process is described with great particularity it may be varied within the scope and limits of the invention, as set forth in the claims appended hereto.

In the drawings in which the several steps of the process are illustrated:

Figure 1:
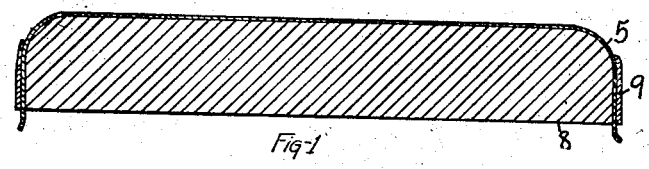
Figure 1 is a cross section of a form having the covering of felt or other fabric as it is given its preliminary shaping.
Figure 2:
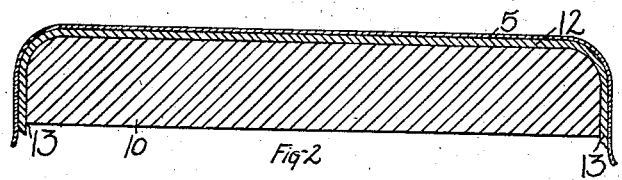
Figure 2 is a similar view showing the layer of compounded, unvulcanized rubber applied to the fabric.
Figure 3:
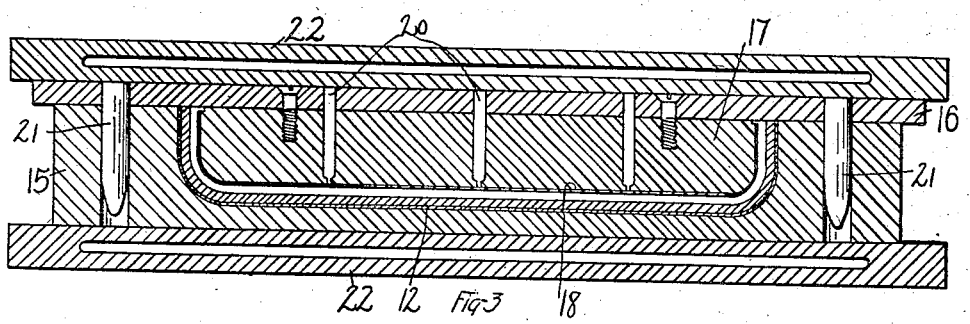
Figure 3 is a cross section through a mold located in a press prior to the actual vulcanizing operation.
Figure 4:
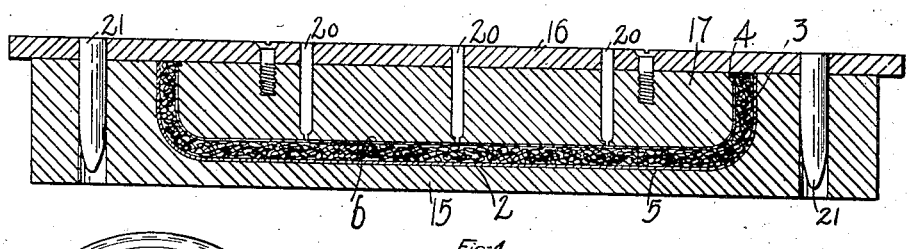
Figure 4 is a view of the mold with the vulcanized cushion therein.
Figure 5:
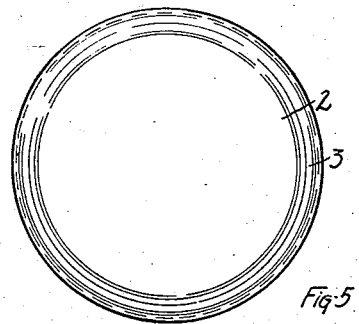
Figure 5 is a plan view of the cushion.

The completed cushion or pad comprises a body of elastic yielding material 2, preferably of sponge rubber which is provided with a downturned flange or rim 3, adapted to fit around the cushion and preferably provided with a locking lip or bead 4 at its inner extremity. The cushion is covered with a smooth layer of felt or other covering and wearing fabric, and may be rounded about its outer periphery as shown at 6.

The smooth application of the fabric covering is often difficult and the present process is designed for the purpose of securing a smooth and evenly applied layer of felt or fabric.

In order to accomplish this purpose the felt 5 is first thoroughly wetted and while damp is applied smoothly and evenly over a temporary form 8 of the shape and size of the finished cushion, the felt being carefully stretched to remove all wrinkles and unevenness. The downturned edge of the felt is clamped and held in position by a broad rubber band 9, a margin being left depending below the form. The felt is then dried and removed from the form 8 and will retain the cupped shape required in the finished article.

A second temporary form 10 slightly smaller than the form 8, is covered with a sheet or layer of unvulcanized rubber 12 of the required thickness and this is shaped about the form 10, a margin being left about the lower edges of the form. The previously shaped felt covering is then applied over the rubber and the depending edges of the rubber and fabric are trimmed at 13. It will be observed that the volume of the form 10 is sufficient to fill the cavity within the felt covering with the layer of unvulcanized rubber. The sheet of rubber being unvulcanized may be easily shaped about the form 10.

The blank prepared in the manner described is then removed from the form and placed within the cavity of a mold 15, the felt being placed next to the mold surface, which it fits without further stretching. The inner surface of the article is dusted with talc to prevent sticking and the mold is then closed by a cover 16, to which is attached a plunger 17 of the shape of the finishing cavity within the cushion. The plunger is covered with a woven fabric 18 which serves as a means for conducting the gases given off in the vulcanization of the rubber to a series of outlets 20 which communicate with the outer surface of the cover. Dowels 21, in the cover assure accurate registry of the mold members. The mold is then placed in the usual press between heated platens 22. The gases will escape between the cover and the upper platen through the irregularities or crevices between these members. In heating the rubber which has been compounded with the usual gasifying ingredients to cause the rubber mass to swell and become porous, filling out the mold cavity and firmly uniting the felt covering and the sponge rubber cushion body.

When the vulcanization is completed a finished cushion will be obtained, smoothly covered with felt, and without edges or margins to be trimmed.

The process may be applied to the manufacture of other articles than the stool cushion illustrated here, and is not necessarily confined to the manufacture of sponge rubber, the changes in the particular details being attained as well known to those skilled in the art.

What is claimed is:

1. The process of manufacturing articles of sponge rubber having a fabric covering, comprising preliminarily shaping the fabric covering to the shape of the finished article, applying a layer of unvulcanized rubber compounded to form sponge rubber upon vulcanization to the interior surface of the felt, and vulcanizing the compound sheet with the felt in contact with one surface of a mold.

2. The process of manufacturing articles of sponge rubber having a fabric covering, comprising preliminarily shaping the fabric covering to the shape of the finished article, applying a layer of unvulcanized rubber compounded to form sponge rubber upon vulcanization to the interior surface of the felt, trimming the compound layer to the exact size of the finished article, and vulcanizing the compound sheet with the felt in contact with one surface of a mold.

3. The process of manufacturing articles of sponge rubber having a fabric covering, comprising dampening the fabric, shaping it over a form and drying, inserting a layer of unvulcanized rubber compounded to form sponge rubber upon vulcanization in the interior of the shaped and dried fabric, and vulcanizing the compound sheet with the fabric in contact with the surface of the mold.

4. The process of manufacturing articles of rubber and fabric, comprising dampening the fabric, shaping it while wet to the form of the finished article, applying a layer of unvulcanized rubber to one surface of the fabric, and vulcanizing the rubber so that it becomes permanently attached to the fabric.

5. The process of manufacturing articles of rubber and fabric, comprising dampening the fabric, shaping it while wet to the surface of a form of the size and shape of the finished article, drying the fabric, applying a layer of unvulcanized rubber about a second form smaller than the first, placing the dried and shaped fabric over the rubber, and vulcanizing the article with the fabric in contact with a mold surface.

6. The process of manufacturing articles of rubber and fabric, comprising dampening the fabric, shaping it while wet to the surface of a form of the size and shape of the finished article, drying the fabric, applying a layer of unvulcanized rubber about a second form smaller than the first, placing the dried and shaped fabric over the rubber, trimming the edges of the blank to the exact size of the finished article, and then vulcanizing the article with the fabric in contact with a mold surface.

MELVIN S. LOWER.